US006917034B2

(12) United States Patent
Iino et al.

(10) Patent No.: US 6,917,034 B2
(45) Date of Patent: Jul. 12, 2005

(54) ELECTRONIC EQUIPMENT EQUIPPED WITH POSITION DETECTION MEANS FOR DETECTING POSITION OF MOVING BODY UTILIZING INCREMENTAL-TYPE ENCODER

(75) Inventors: Akihiro Iino, Chiba (JP); Mizuaki Suzuki, Chiba (JP); Masao Kasuga, Chiba (JP)

(73) Assignee: Seiko Instruments Inc., Chiba (JP)

( * ) Notice: Subject to any disclaimer, the term of this patent is extended or adjusted under 35 U.S.C. 154(b) by 61 days.

(21) Appl. No.: 10/187,577

(22) Filed: Jul. 2, 2002

(65) Prior Publication Data

US 2003/0052287 A1 Mar. 20, 2003

(30) Foreign Application Priority Data

Jul. 3, 2001 (JP) .................................. 2001-202208

(51) Int. Cl.[7] ............................................... G01D 5/34
(52) U.S. Cl. ................................................... 250/231.13
(58) Field of Search ...................... 250/231.1–231.19, 250/555, 557; 356/399–401, 616–620

(56) References Cited

U.S. PATENT DOCUMENTS

| 3,906,223 | A | * | 9/1975 | White ................... 250/231.18 |
| 4,491,826 | A | * | 1/1985 | Krogh et al. .................. 341/6 |
| 4,802,777 | A | * | 2/1989 | Yamada .................... 400/144.2 |
| 4,803,354 | A | * | 2/1989 | Onodera et al. ....... 250/231.16 |
| 5,210,562 | A | * | 5/1993 | Miyazawa et al. ............ 396/49 |
| 6,399,941 | B1 | * | 6/2002 | Nakagaki et al. ...... 250/231.13 |

\* cited by examiner

*Primary Examiner*—Thanh X. Luu
(74) *Attorney, Agent, or Firm*—Adams & Wilks (57) ABSTRACT

An electronic equipment has a movable body and a position detecting device having an incremental-type encoder and an incremental-type counter. The position detecting device detects a position of the movable body by setting a starting point of position detection by the incremental-type encoder to a position that the movable body passes through most frequently during movement thereof.

20 Claims, 8 Drawing Sheets

ELECTRONIC EQUIPMENT EQUIPPED WITH POSITION DETECTION MEANS FOR DETECTING POSITION OF MOVING BODY UTILIZING INCREMENTAL-TYPE ENCODER

BACKGROUND OF THE INVENTION

1. Field of the Invention

The present invention relates to an electronic equipment equipped with a position detector or detecting means for detecting the position of a moving body using an incremental type encoder.

2. Description of Related Art

Electronic equipment for measuring the position of a moving body and electronic equipment for exerting control in such a manner as to decide the position of a target position for a moving body is equipped with detection means for detecting the current position of the moving body. Typically, an absolute type encoder is used for obtaining absolute position information as means for detecting the position of movement of the moving body regardless of whether the movement is rotational or linear. However, in the case of an absolute type encoder problems arise such as an increase in cost that accompanies the signal processing circuitry being large and complex, and incremental type encoders are therefore widely used. The position of the moving body for carrying out rotational movement is directly detected using an incremental type encoder. Further, the position of a moving body moving in a linear manner is detected indirectly by detecting the position of a rotor of a motor driving the moving body using an incremental type encoder. An optical attenuator with a rocking moving body using an incremental type encoder. An optical attenuator with a rocking moving body and an optical linear filter with a reciprocally moving body, for example, may be taken as the electronic equipment equipped with position detection means for detecting the position of a moving body using an incremental type encoder.

Figure 3:
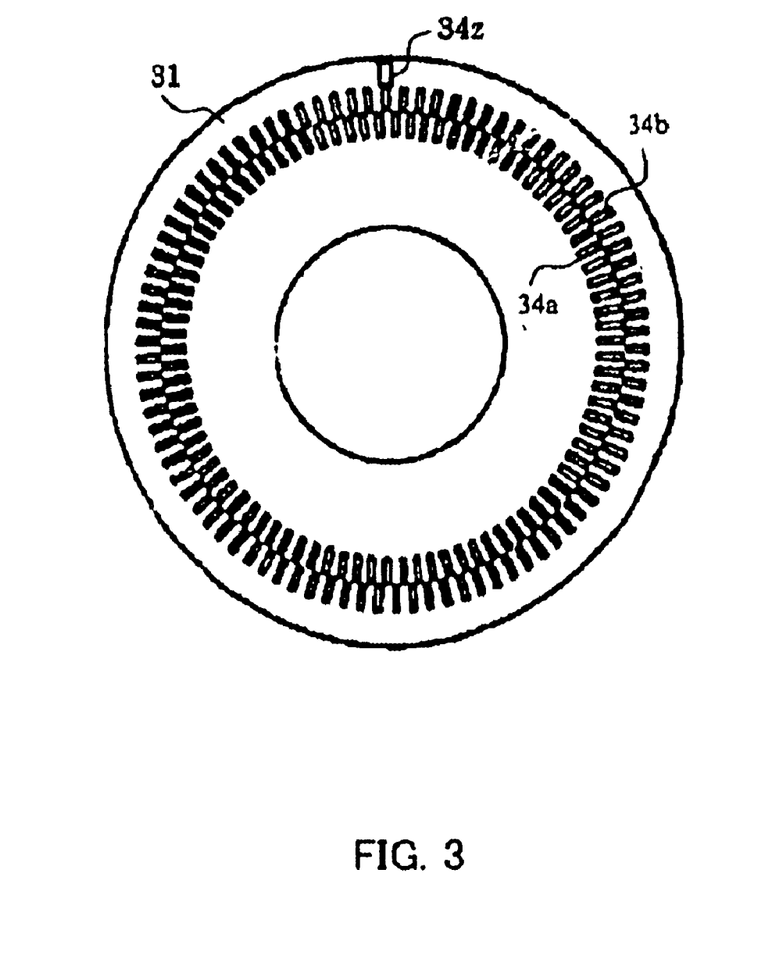
FIG. 3 is an example of an encoder scale for an incremental type encoder.

As shown in FIG. 3, an incremental type encoder has a known readable member such as a disk-shaped encoder scale 31 formed from a large number of slits for detecting changes in the amount of rotation constituted by rows of inner and outer slits, i.e. inner slits 34a and outer slits 34b, and one absolute position slit 34z for detecting absolute position information. The position of the inner slit 34a and the outer slit 34b is decided in such a manner that phases of pulse signals generated based on an optical beam passing through the slits differ by ninety degrees.

Figure 2:
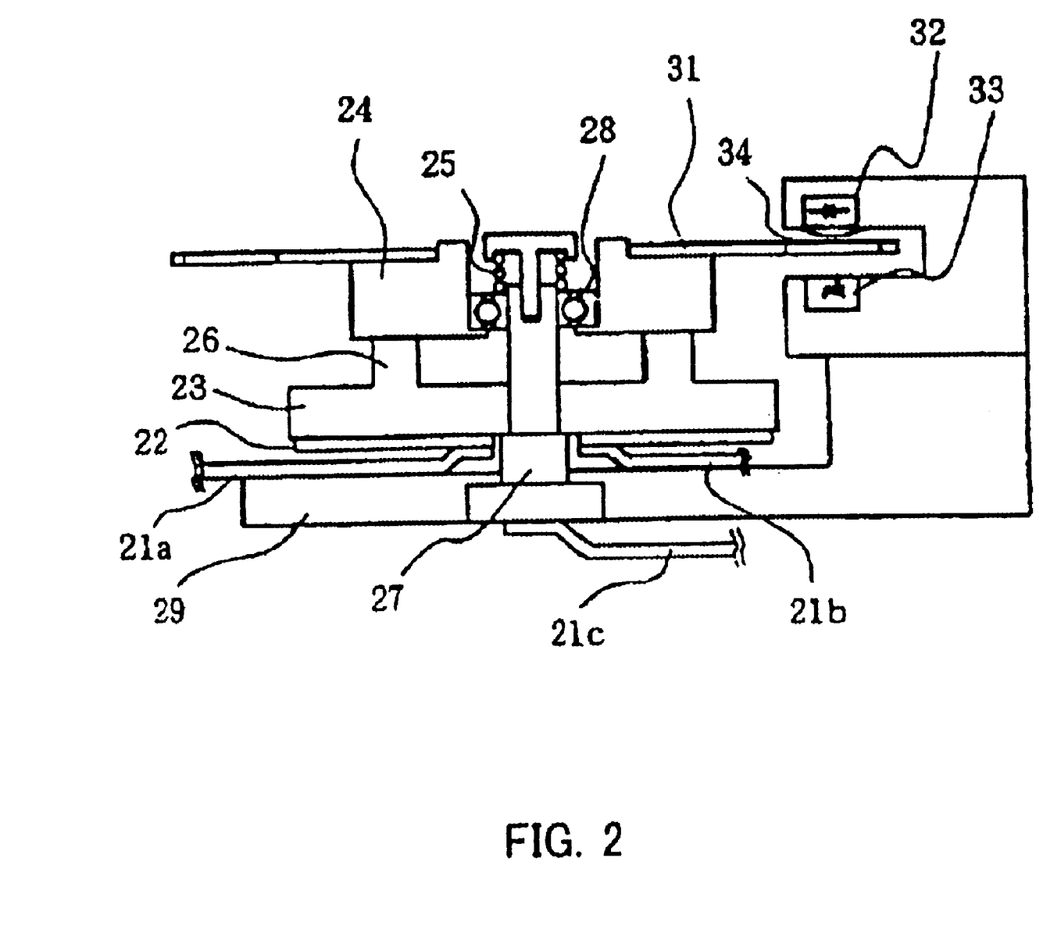
FIG. 2 is a longitudinal cross-sectional view of the main parts of the ultrasonic motor and an encoder of FIG. 1.

The following is a detailed description with reference to FIG. 2 of the structure of an encoder fitted to an ultrasonic motor. In FIG. 2, the moving body 24 is a rotor supported in a freely rotatable manner at an axis 27 via a bearing 28. The axis 27 is installed so as to stand up at a motor substrate 29 and the disk-shaped oscillating body 23 is fixed to the same axis as the axis 27. A plurality of projections 26 are integrally formed at the upper surface of the disk-shaped oscillating body 23, while a piezoelectric material 22 is connected to the lower surface. A pair of electrode plates formed in a prescribed electrode pattern, i.e. an electrode 21a for rotation in a clockwise direction and an electrode 21b for rotation in an anti-clockwise direction are arranged at the lower surface of the piezoelectric material 22. The oscillating body 23 that also functions as a common electrode plate for the upper surface of the piezoelectric material 22 is electrically connected to a common electrode 21c. A spring 25 constituting pressing means pushes the rotor 24 in the direction of the oscillating body 23 and presses against upper end surfaces of the plurality of projections 26 at the lower surface of the rotor 24.

The disk-shaped encoder scale 31 shown in FIG. 3 is arranged so as to be attaching to the upper surface of the rotor 24 of the ultrasonic motor. A light emitting element 32 comprising 32a, 32b and 32c (not shown) and a light receiving element 33 comprising 33a, 33b and 33c (not shown) are positioned so as to respectively correspond to the inner slit 34a, the outer slit 34b and the absolute position slit 34z and are mounted to the motor substrate 29 in such a manner as to sandwich the disk-shaped encoder scale 31. The light beam from the light emitting element 32 is then received by the light receiving element 33 after passing through the inner slit 34a, the outer slit 34b and the absolute position slit 34z.

Figure 6A:
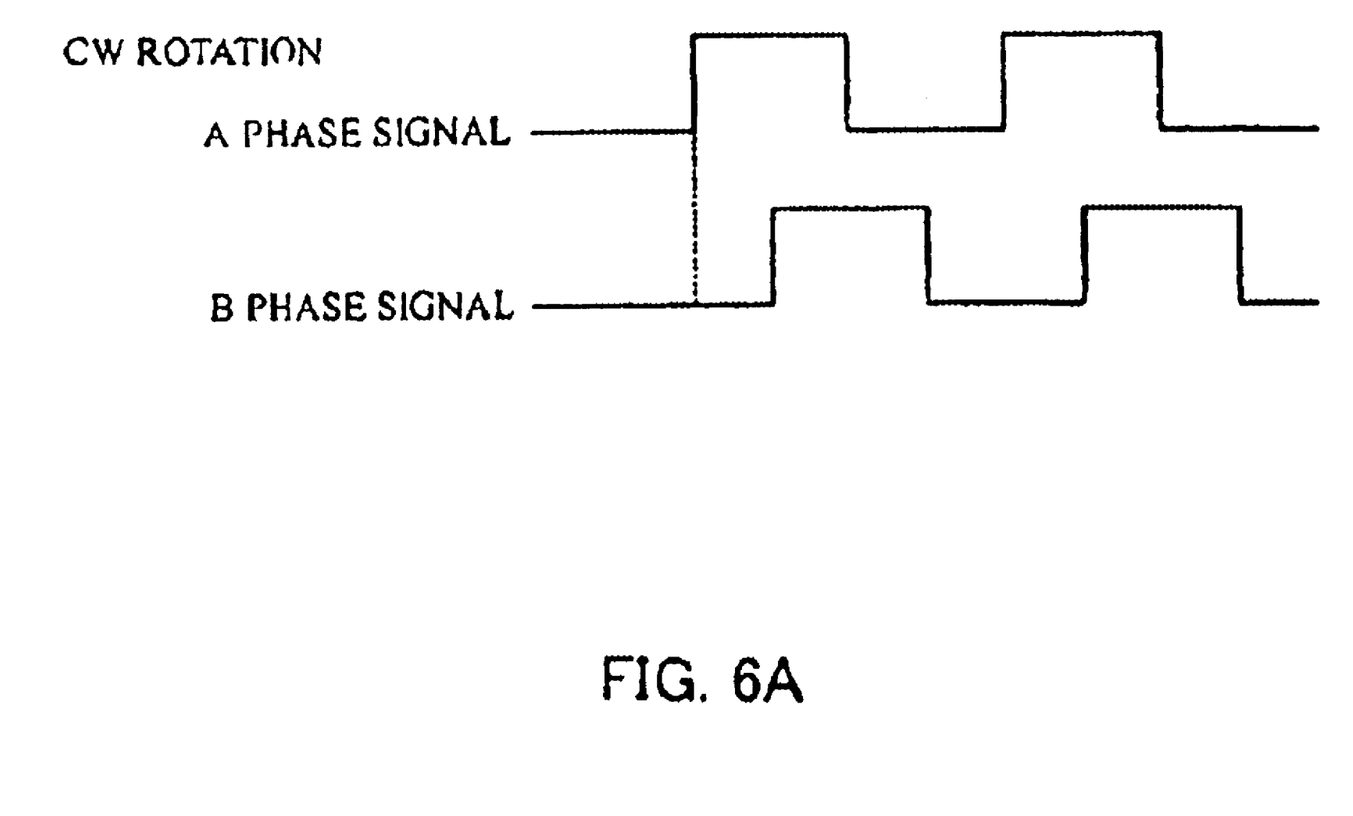
Figure 6B:
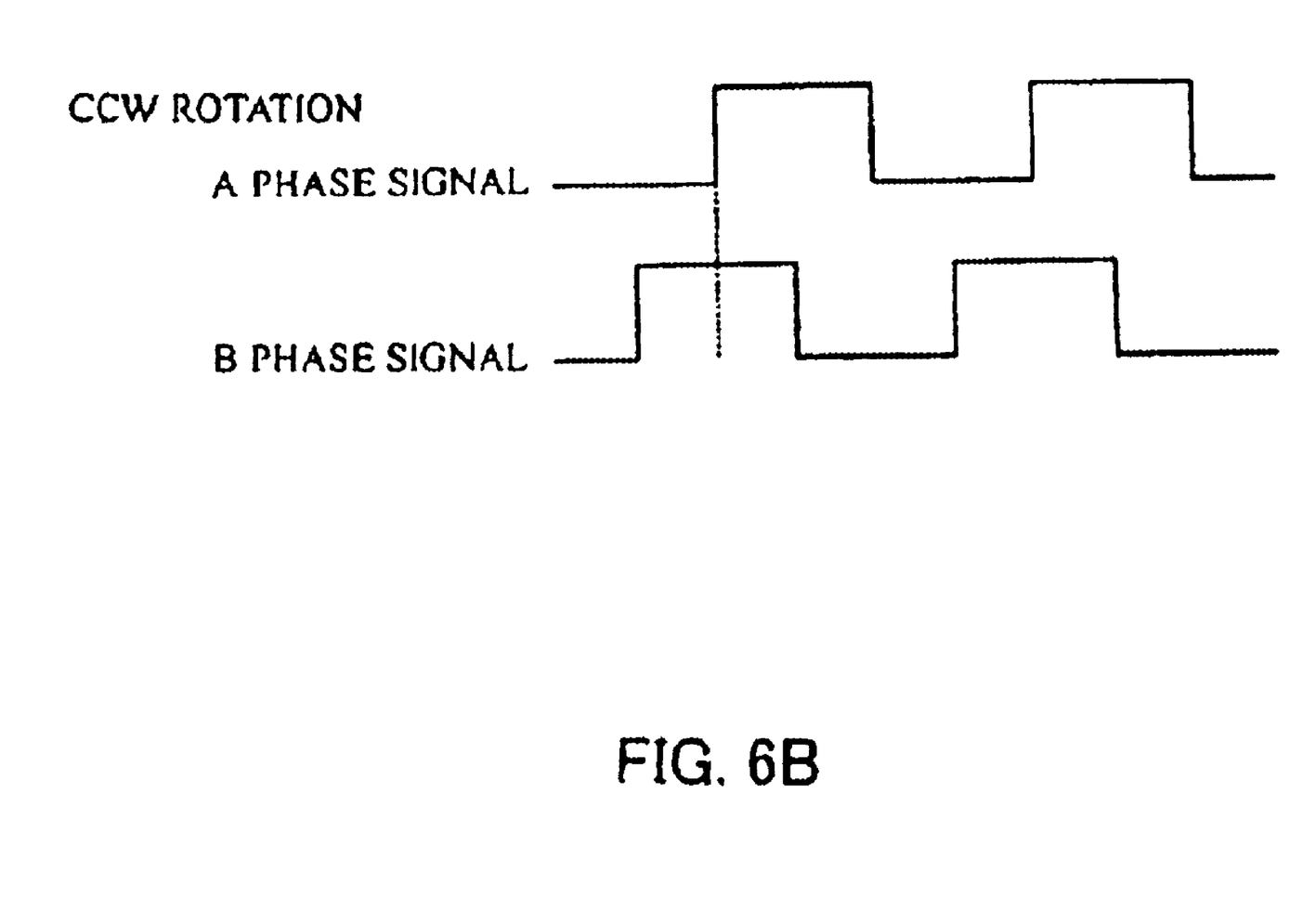

As described above, the position of the inner slit 34a and the outer slit 34b is decided in such a manner that phases of pulse signals generated based on an optical beam passing through the slits differ by ninety degrees. The output pulse signal of the incremental type encoder therefore becomes as shown in FIG. 6. Phase A is a pulse signal generated based on a light beam passing through the inner slit 34a and phase B is a pulse signal generated based on a light beam passing through the outer slit 34b. FIG. 6A shows an output pulse signal for the case of rotation in a clockwise direction CW and FIG. 6B shows an output pulse signal for the case of rotation in an anti-clockwise direction CCW.

Figure 7:
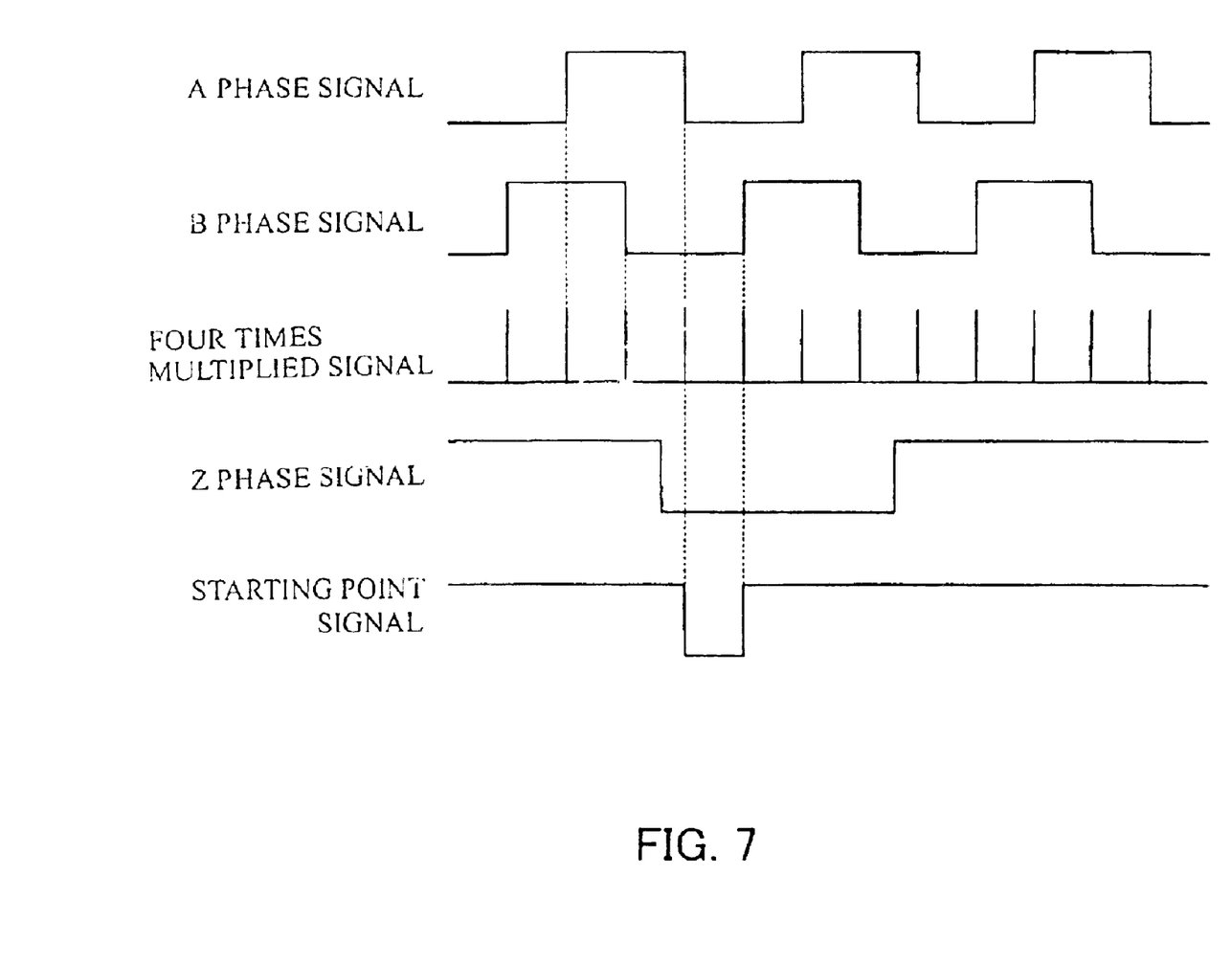
FIG. 7 is a waveform diagram showing the relationship between the A phase signal of the incremental type encoder, the B phase signal, the Z phase signal, the four times multiplied signal and the starting point signal.

The signal used in position detection is a single four times multiplied signal obtained from the A phase signal and the B phase signal. As shown in FIG. 7, the four times multiplied signal is a pulse signal generated using the rising edge and the falling edge of the two output pulse signals for an A phase and B phase that differ in phase by ninety degrees. Resolution that is four times that of the A phase signal or the B phase signal can therefore be obtained by using this signal in position detection. A Z phase signal that provides absolute position information is a pulse signal with a pulse width that is approximately twice that of the A phase signal or the B phase signal.

An incremental type encoder is capable of detecting both forward and reverse rotation and can detect position with a high degree of resolution and is therefore widely utilized as a means of detecting the position of movement of moving bodies. In this case, the output pulse signal of the incremental type encoder is counted by a counter and the position of the moving body is detected based on this count value. Therefore, with an incremental type counter where the count value for the starting point position is set to zero, the count value for the case of rotation in a clockwise direction by an m pulse portion is +m, with the count value returning to zero in the case of rotation by an m pulse portion in an anti-clockwise direction. Similarly, the count value for the case of rotation in an anti-clockwise direction by an n pulse portion is −n, with the count value returning to zero in the case of rotation by an n pulse portion in a clockwise direction. In either case, if the start point is returned to, the count value is returned to zero. However, errors become included in the position information when an incremental type counter is subjected to noise. There is also a problem in that such errors remain during use. In other words, there is a problem that there is a shift in the starting point of the position detection means die to noise.

A first problem to be resolved is to ensure that with electronic equipment equipped with position detection means for detecting the position of a moving body using an incremental type encoder and an incremental type counter, a starting point of the position detection means is not subjected to the influence of noise, etc. A second problem to be resolved is to ensure that with electronic equipment equipped with position detection means for detecting the position of a moving body using an incremental type encoder and an incremental type counter, an increase in reliability and a decrease in power consumption are achieved.

SUMMARY OF THE INVENTION

In the present invention for resolving the aforementioned problems, electronic equipment is equipped with position detection means for detecting the position of a moving body. The position detection means comprises an incremental type encoder and an incremental type counter. A location detected for a starting point of position detection by the incremental type encoder is then set to a position the moving body passes through the most frequently or a position decided upon the most frequently as a starting point.

Further, in order to resolve the aforementioned problems, there is provided electronic equipment equipped with position detection means for detecting the position of a moving body. The position detection means comprises an incremental type encoder, an incremental type counter and a start point signal producing circuit. A location detected for a starting point of position detection by the incremental type encoder is then set to a position the moving body passes through the most frequently or a position decided upon the most frequently as a starting point, and the incremental type counter is reset by the starting point signal of the starting point signal producing circuit.

In order to resolve the problems, there is, provided electronic equipment equipped with position detection means for detecting the position of a moving body. Here, the moving body is a moving body that moves in a rocking manner, and the location detected for the starting point is set to a position approximately at the center of a range of rocking of the moving body.

Further, there is provided electronic equipment equipped with position detection means for detecting the position of a moving body. Here, the moving body is a moving body that moves in a reciprocal manner, and the location detected for the starting point is set to a position approximately at the center of a range of reciprocal movement of the moving body.

Here, the starting point signal nay be made using a pulse signal outputted by the incremental type encoder.

The starting point signal may be obtained using an A phase signal and a B phase signal differing in phase by ninety degrees outputted by the incremental type encoder and by carrying out a logical AND operation taking a Z phase signal providing absolute position information as input.

Further, in order to resolve the aforementioned problems, electronic equipment equipped with position detection means for detecting the position of a moving body comprises drive means for driving a moving body, position detection means for detecting a moving position of the moving body and outputting a current position signal, and control means for controlling the drive means in such a manner that the moving body is positioned at the target position based on the target position signal and the current position signal. The position detection means comprises an incremental type encoder, an incremental type counter, and a start point signal producing circuit, and a location where a start point for position detection is detected by the incremental type encoder is set to be a position the moving body passes through most frequently or a position decided upon the most frequently as a starting point, and the incremental type counter is reset by the start point signal of the start point signal producing circuit.

The drive means may be an ultrasonic motor.

Still further, in order to resolve the aforementioned problems, there is provided electronic equipment equipped with position detection means for detecting the position of a moving body, wherein the driving means is an ultrasonic motor, the control means turns the ultrasonic motor off from completion of the deciding of the position of the moving body until position deciding starts again so that the position of the moving body is maintained, causes the moving body to move up the a position where a start point is detected when a position deciding instruction to go to a new target position is issued, and exerts control in such a manner as to decide positioning at the new target position after resetting of a total for the incremental type counter.

BRIEF DESCRIPTION OF THE DRAWINGS

FIG. 6 is a waveform diagram showing waveforms for the A phase signal and the B phase signal of the incremental type encoder, with FIG. 6A being for the time of rotation in a clockwise direction, and FIG. 6B being for the time of rotational movement in an anti-clockwise direction.

DETAILED DESCRIPTION OF THE PREFERRED EMBODIMENTS

Figure 1:
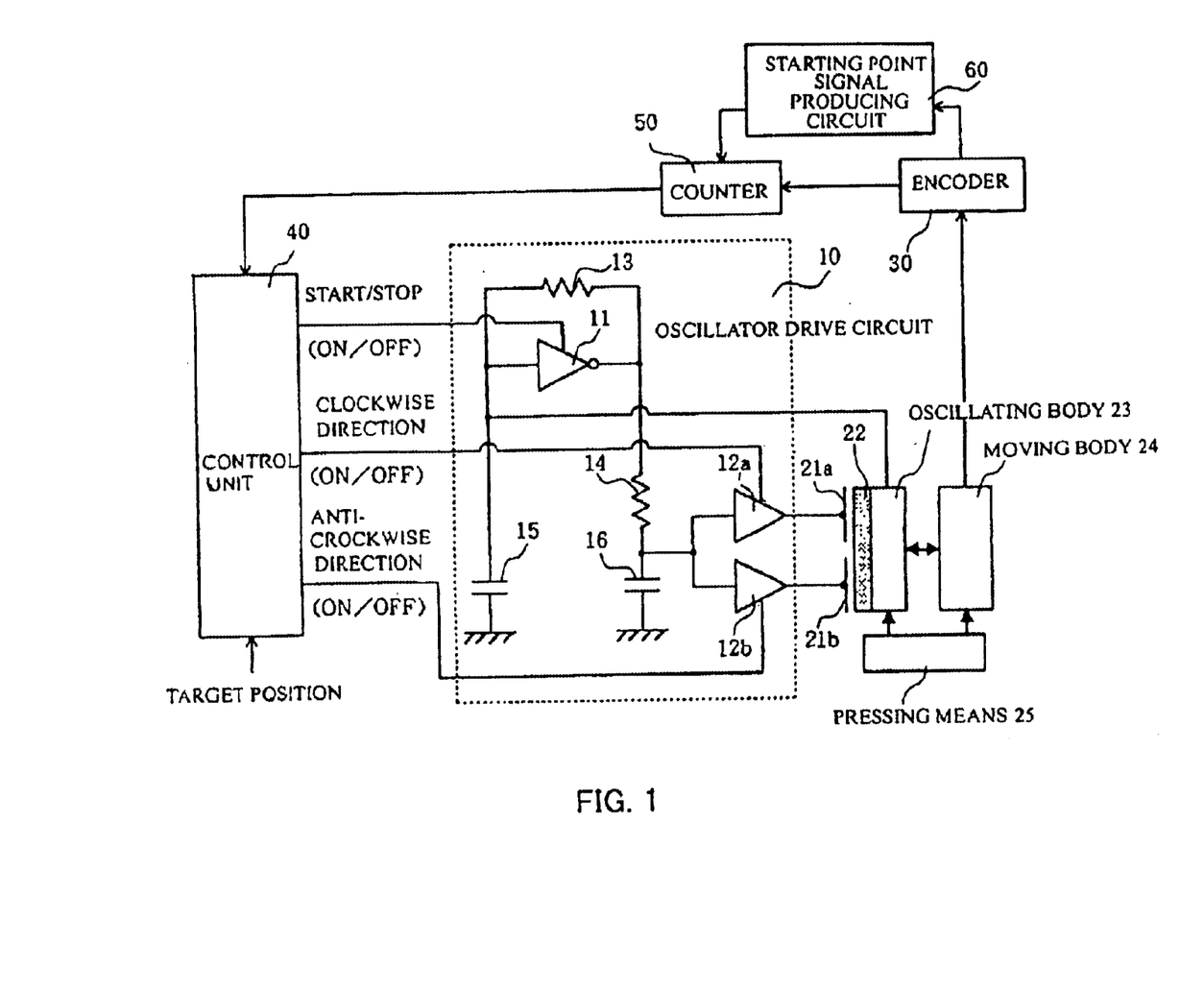
FIG. 1 is a block circuit diagram of a first embodiment of electronic equipment of the present invention using an ultrasonic motor as means for driving a moving body.

FIG. 1 is a block view showing a first embodiment of an electronic equipment of the present invention employing an ultrasonic motor as means for driving a moving body. The ultrasonic motor shown in FIG. 1 has an oscillating body 23 to which a piezoelectric material 22 is attached, a moving body 24 arranged in such a manner as to be rotated in a clockwise direction or anti-clockwise direction by vibration of the oscillation body 23, pressing means 25 for causing the moving body 24 to be pressed against the oscillation body 23, a pair of electrodes 21a and 21b for applying a high-frequency voltage to the piezoelectric material 22, and a oscillator drive circuit 10 for generating the high-frequency voltage. Electrode 21a is used for rotation in a clockwise direction and electrode 21b is used for rotation in an anti-clockwise direction.

The oscillator drive circuit 10 includes resistors 13 and 14, and capacitors 15 and 16. The oscillator drive circuit 10 has a start/stop inverter 11, a buffer 12a for rotation in a clockwise direction, and a buffer 12b for rotation in an anti-clockwise direction. The oscillator drive circuit shown in FIG. 1 comprises a Colpitts oscillating circuit-type self-exciting oscillation circuit that adopts these circuit elements and the piezoelectric material 22 as the oscillator. This kind of self-exciting oscillation circuit is disclosed in detail in the paper "Development in of a micro ultrasonic motor using a self-excitation driving" in a precision engineering institution journal, (Vol.64, No.8, pp.1117–1121).

In FIG. 1, the position detector or detection means comprises as incremental type encoder 30, an incremental type counter 50, and a start point signal producing circuit 60. The incremental type encoder 30 continually detects the current position of the moving body 24 and generates the output pulses shown in FIG. 6 and FIG. 7. The output pulses of the incremental type encoder 30 are A phase output pulse, B phase output pulse, and Z phase output pulse corresponding to the slits 34a, 34b and 34z formed in the encoder scale 31 of FIG. 3. The incremental type encoder 30 is equipped with a function for generating the four times multiplied signal shown in FIG. 7 based on the A phase output pulse and the B phase output pulse. The four times multiplied signal is inputted to the incremental type counter 50 and counted.

The output signal of the incremental type counter 50 i.e. a count value showing the current position of the moving body 24 is inputted to the control unit 40. The start point signal producing circuit 60 makes a start point signal based on the A phase output pulse, B phase output pulse and Z phase output pulse from the incremental type encoder 30. The start point signal is then used as the reset signal for the incremental type counter 50. The position detection means characterizing the present invention will again be described in detail after a description of the structure and operation of the electronic device of FIG. 1.

The target position of the moving body 24 is decided in advance at the control unit 40 by input means (not shown). Alternatively, the target position for the moving body 24 can always be inputted at the control unit 40 from an external device (not shown). The control unit 40 compares the inputted target position and the current position from the position sensor and exerts control to decide positioning in such a manner that the current position of the moving body 24 always coincides with the target position.

The control for deciding positioning is carried out by providing a control instruction signal to the oscillator drive circuit 10 from the control unit 40. The control instruction signals consist of stat instruction md stop instruction signals, clockwise direction rotation instruction signals, and anti-clockwise direction rotation instruction signals, and are provided to the start/stop inverter 11, the clockwise direction rotation buffer 12a, and the anti-clockwise direction rotation buffer 12b. The control instruction signal is an ON/OFF signal.

FIG. 2 is a longitudinal cross-sectional view of the main parts of the ultrasonic motor and the position detection means of FIG. 1. In FIG. 2, the moving body 24 is a rotor supported in a freely rotatable manner on an axis 27 via a bearing 28. The axis 27 is installed so as to stand up at a motor substrate 29 and the disk-shaped oscillating body 23 is fixed to the same axis as the axis 27. A plurality of projections 26 are integrally formed at the upper surface of the disk-shaped oscillating body 23, while the piezoelectric material 22 is attached to the lower surface. A pair of electrode plates formed in a prescribed electrode pattern, i.e. an electrode 21a for rotation in a clockwise direction and an electrode 21b for rotation in an anti-clockwise direction are arranged at the lower surface of the piezoelectric material 22. The oscillating body 23 that also functions as a common electrode plate for the upper surface of the piezoelectric material 22 is electrically connected to a common electrode 21c. A spring 25 constituting pressing means pushes the rotor 24 in the direction of the oscillating body 23 and presses against upper end surfaces of the plurality of projections 26 at the lower surface of the rotor 24.

With a stationary wave-type ultrasonic motor of this kind of configuration, when high-frequency voltage is applied across the electrode 21a for clockwise direction rotation or the electrode 21b for anti-clockwise direction rotation 21b and the common electrode 21c, and periodical vibrations are generated at the oscillating body 23 by expansion and contraction of the piezoelectric material 22. These periodic vibrations are stationary waves and periodic vibrations of the oscillating body 23 are transmitted as power to the rotor 24 connected by pressure to the plurality of projections 26 using the springs 95.

The rotor 24 is driven by frictional force due to an oscillatory wave generated by the oscillating body 23 due to the action of the plurality of projections 26 formed so as to be arranged at prescribed intervals with a prescribed electrode pattern and is made to rotate in a clockwise direction or an anti-clockwise direction. Namely, when a high-frequency voltage is applied across the electrode 21a for rotation in a clockwise direction and the common electrode 21c, the rotor 24 rotates in a clockwise direction, and when a high-frequency voltage is applied across the electrode 21b for rotation in an anti-clockwise direction and the common electrode 21c, the rotor 24 rotates in an anti-clockwise direction.

Figure 4:
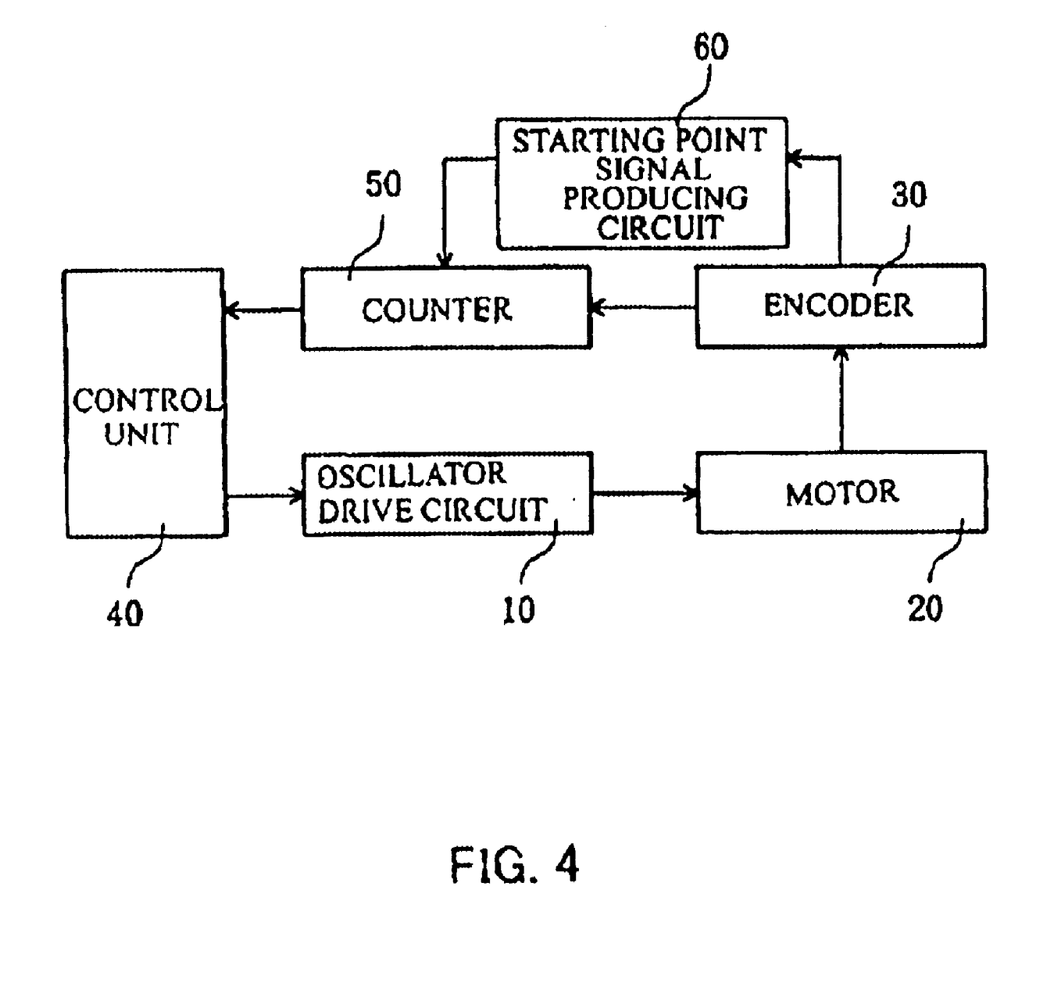
FIG. 4 is a block circuit diagram of an embodiment of electronic equipment of the present invention.

The following is a detailed description with reference to the drawings of position detection means characterizing the present invention. The electronic equipment shown in the block view in FIG. 4 is equipped with position detecting means for detecting the position of a moving body (not shown) driven by a motor 20, with the control unit 40 also controlling the motor driver 10 in such a manner as to position the current position of the detected moving body at the target position. The position detection means comprises an incremental type encoder 30, an incremental type counter 50, and a start point signal producing circuit 60.

As shown in FIG. 3, an incremental type encoder 30 has a known readable member of a disk-shaped encoder scale 31 having inner slits 34a and outer slits 34b, and one absolute position slit 34z for detecting absolute position information. The position of the inner slit 34a and the outer slit 34b is decided in such a manner that phases of pulse signals generated based on an optical beam passing through the slits differ by ninety degrees. Therefore, as shown in FIG. 6, the incremental type encoder 30 outputs an A-phase signal generated based on a light beam passing through the inner slit 34a and a B-phase signal generated based on a light beam passing the outer slit 34b.

The direction of rotation of the rotor can then be determined by looking at the phase differences (leading or lagging) of the A phase signal and the B phase signal. FIG. 6A shows an output pulse signal for the case of rotation in a clockwise direction CW and FIG. 6B shows an output pulse signal for the case of rotation in an anti-clockwise direction CCW.

The counter 50 is equipped with a function for generating the four times multiplied signal shown in FIG. 7 based on the A phase signal and the B phase signal. A resolution of four times the number of slits can therefore be obtained by multiplying the A phase signal and the B phase signal by four. Therefore, when a 15000 pulse (for each of phases A and B) encoder is used, position resolution information of 60,000 pulses, i.e. 0.006 degrees is obtained after four times multiplication.

The incremental type encoder 30 has an encoder scale 31 formed from slits 34z for absolute position detection as shown in FIG. 3 and absolute position detection means consisting of light emitting elements and light receiving elements located so as to correspond to these slits 34z. The incremental type encoder 30 therefore outputs an A phase signal and a B-phase signal, together with a Z-phase signal, as shown in FIG. 7.

As described above, the electronic equipment equipped with the position detection means of the present invention is characterized by setting a location detected for a position detecting starting point using an incremental type encoder 30 to a position which the moving body passes through the most frequently or to a position for which the position deciding frequency is the greatest. This ensures that the starting point for the position detection means is not influenced by noise, etc.

Figure 5:
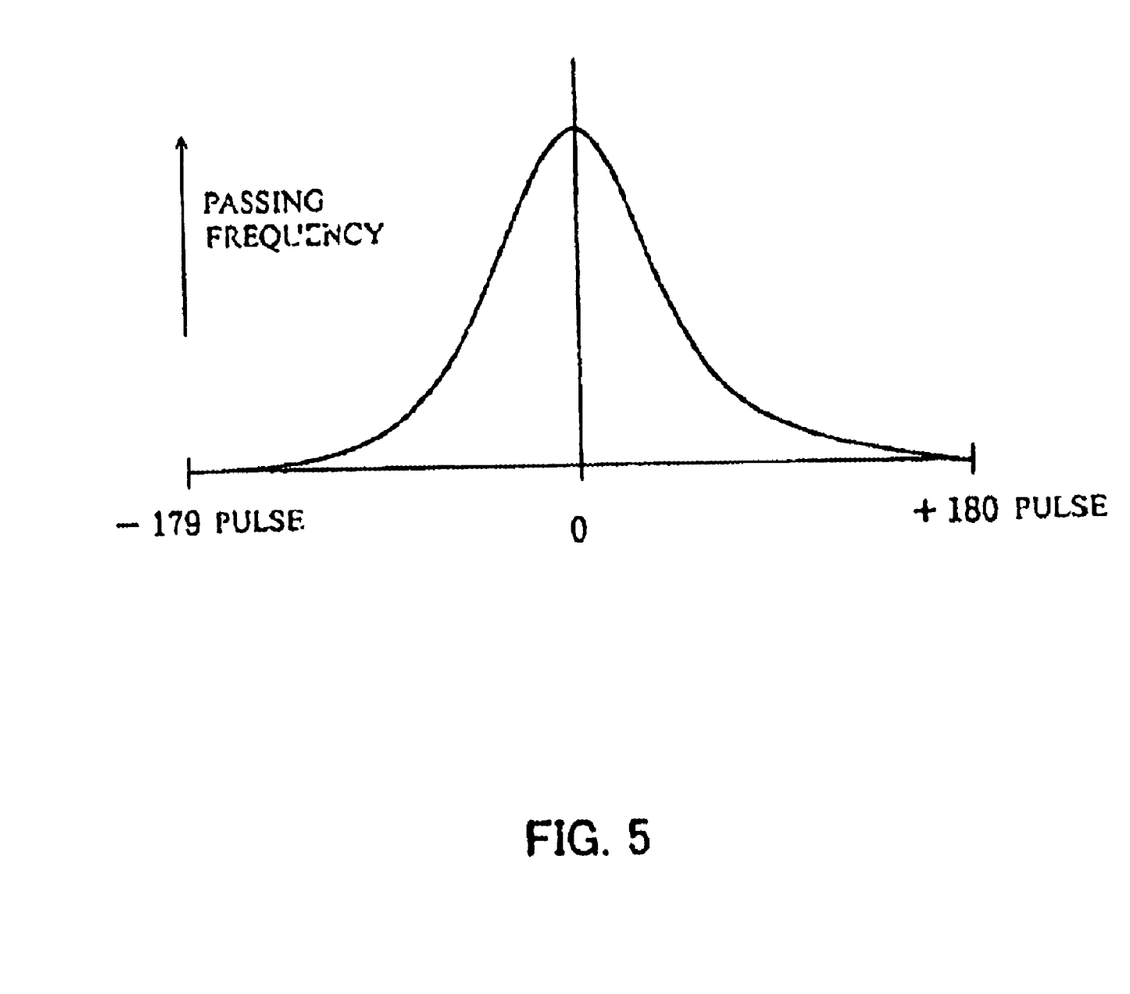
FIG. 5 is a view showing an example the frequency with which a moving body passes through to which the present invention is applied.

A description is given of the application of the present invention to the moving body moving in a reciprocal or rocking manner shown, for example in FIG. 5 where the rotational speed shown by the pulse number is taken as the horizontal axis and the movement frequency is taken as the vertical axis.

As shown in FIG. 5, with electronic equipment where the frequency of passing through of the moving body is at a maximum at the central position and where passage frequency is reduced when there is rotation in a clockwise direction or an anti-clockwise direction from this central position, the incremental type counter 50 is installed in such a manner that the position of the reset value zero of the incremental type counter 50 is lined up with the absolute position detection position. In other words, the Z-phase signal output position is lined up with the position which the moving body passes through the most frequently or with the position decided upon the most frequently as a starting point, with the incremental type counter 50 being reset to zero using the Z-phase signal. Specifically, the lining up of the output position of the Z-phase signal with the position that is passed through the most frequently or with the position for which the position deciding frequency is the greatest is such that the position of the absolute position detection slit 34z is set to the position which the moving body passes through the most frequently or to the position for which the position deciding frequency is the greatest. It is therefore difficult for the starting position for position detection to be influenced by noise with this configuration.

As shown in FIG. 7, the Z phase signal is a pulse signal with a broader width than the A phase signal and B phase signal. The absolute position detection slit 34z is also formed to have a broader slit width than the A phase signal slit 34a and the B phase signal slit 34b. The pulse width of the Z phase signal is such that it can contain four of the four times multiplied signals used in position detection counting. When the Z phase signal is utilized as a reset signal for the incremental type counter 50, there is a problem where the reset position differs by four from the four times multiplied signal on the rising edges and the falling edges. There is also a problem where shifts in the count value occur due to errors in the direction of rotation at the time of starting point position confirmation. In order to resolve these problems, the starting point signal generating circuit 60 of the present invention is equipped with the following functions.

The starting point position generating circuit 60 constituting the position detecting means is equipped with a function for taking the three pulse signals, the A phase signal, B phase signal and Z phase signal outputted by the incremental type encoder 30 as input and carrying out arithmetic logic operations. As shown in FIG. 7, a function is provided where a logical AND operation making an AND condition signal for the LOW level signal for the A phase signal, B phase signal and Z phase signal is carried out and the output pulse for these arithmetic results is taken as a starting point signal. The start point signal obtained in this manner is then taken as a zero reset signal for the incremental type counter 50. A source point signal equal to the dividing width after four times multiplication can therefore be made regardless of the position of the Z phase signal or variations in the width. The occurrence of shifts in the count value occurring due to errors in the direction of rotation during starting point position confirmation can also be prevented.

A description is now given of the operation of the characteristics in the case of application of the present invention to electronic equipment employing an ultrasonic motor as drive means for the moving body, as shown, for example, in FIG. 1 and FIG. 2, i.e. to electronic equipment equipped with an ultrasonic motor for driving a moving body, position detection means for detecting a position of movement of the moving body and outputting the current position signal, and control means for controlling the ultrasonic motor based on a target position signal and a signal for the current position in such a manner that the moving body is positioned at the target position.

In the case of applying the present invention to electronic equipment employing an ultrasonic motor as drive means for the moving body as shown in FIG. 1 and FIG. 2, the position detection means comprise the incremental type encoder 30, the incremental type counter 50 and the start point signal producing circuit 60. The location detected as the starting point for position detection by the incremental type encoder 30 is then set to the position through which the moving body 24 passes through the most frequently or the position decided upon the most frequently as a starting point. The incremental type counter 50 is then reset by the starting point signal of the start point signal producing circuit 60.

In addition to the above, the characteristics of the ultrasonic motor are fully utilized in the case of applying the present invention to electronic equipment employing an ultrasonic motor as drive means for the moving body 24. Namely, the ultrasonic motor is off from when position deciding for the moving body 24 ends until the position deciding starts again and the current position of the moving body 24 is maintained. This control operation is carried out by the control unit 40. A self-holding function of the ultrasonic motor is brought into action as a result of putting the drive supply of the ultrasonic motor off during the ending of position deciding to the restarting of the new position deciding and the moving body can therefore continue to be forcibly held at the decided position. This both brings about reduced power consumption and prevents shifts in the position of the moving body.

Further, when a position deciding instruction is generated to go to a new target position, the moving body 24 moves until the position where the starting point is detected, and the count value for the incremental type counter 50 is put to zero. This control operation is also carried out by the control unit 40. In this way, if, by any chance, the position of the moving body 24 shifts, it is possible to once again carry out error correction.

Although a detailed description is given in the above of a configuration and operation for an embodiment of the present invention shown in the drawings, but the electronic equipment to which the present invention is applied may also be typified by meters or optical information communication equipment equipped with a moving body moving in a rocking manner, optical linear filters constituted by optical information equipment equipped with moving bodies moving in a reciprocal manner, or optical attenuators provided with a shutter function where the moving body is a shutter. With such electronic equipment, when the moving body driving means is a motor, the moving body may be directly utilized as a rotor constituting a part making up a motor, or, with the rotor, driving may be provided using a moving member (not shown) so as to bring about rocking movement, reciprocal movement, or rotational movement. In either case, a location detected for a position detecting starting point using an incremental type encoder 30 is set to a position which the moving body passes through the most frequently or to a position for which the frequency is decided upon as a starting point is the greatest. This means that the incremental type counter 50 can be frequently reset to zero and that there is almost no shifting in the starting point of the position detection means due to noise etc.

When the position deciding frequency cannot be predicted such as, for example, when control of this equipment is designated by the user themselves, similar results can be anticipated by forcibly setting the starting point to an approximately central position of a range in the case of within a range of rocking of a moving body or within a range of reciprocal movement.

A description is given of an embodiment applied to electronic equipment using an ultrasonic motor as the moving body driving means but the present invention may also be applied to electronic equipment using direct current motors or other driving means. The ultrasonic motor may also be a traveling wave ultrasonic motor rather than a stationary wave ultrasonic motor.

The present invention therefore improves the reliability of electronic equipment equipped with position detection means for detecting the position of a moving body using an incremental type encoder and an incremental type counter. According to the present invention, position information can be reliably corrected during operation even if errors in position information occur due to noise etc. because the incremental type counter is frequently reset to zero. With electronic equipment equipped with position detecting means for detecting the position of a moving body using an incremental type encoder and an incremental type counter, by using an ultrasonic motor as means for driving the moving body, the power supply for the driving means and the position detecting means can be turned off after completion of position deciding and a dramatic reduction in power consumption can therefore be achieved. The feature that it becomes difficult to move the position decided upon due to the retentivity of the ultrasonic motor when the motor is not excited can therefore be utilized and re-execution of error correction is possible even if by some chance the position of the starting point becomes shifted.

What is claimed is:

1. An electronic equipment comprising: a movable body; and position detecting means comprised of an incremental-type encoder and an incremental-type counter for detecting a position of the movable body by setting a starting point of position detection by the incremental-type encoder to a position the movable body passes through most frequently during movement of the movable body, the position detecting means including means for carrying out a logical operation of a signal outputted by the incremental-type encoder to obtain a starting point signal for position detection.

2. An electronic equipment according to claim 1; wherein the movable body is mounted to undergo pivotal movement; and wherein the position the movable body passes through most frequently is a position disposed approximately at a center of a range of pivotal movement of the movable body.

3. An electronic equipment according to claim 1; wherein the movable body is mounted to undergo reciprocal movement; and wherein the position the moving body passes through most frequently corresponds to a position disposed approximately at a center of a range of reciprocal movement of the movable body.

4. An electronic equipment according to claim 1; wherein a starting point signal for position detection is obtained using a pulse signal outputted by the incremental-type encoder.

5. An electronic equipment comprising: a movable body; and position detecting means comprised of an incremental-type encoder and an incremental-type counter for detecting a position of the movable body by setting a starting point of position detection by the incremental-type encoder to a position the movable body passes through most frequently during movement of the movable body; wherein a starting point signal for position detection is obtained using an A phase signal and a B phase signal differing in phase by ninety degrees outputted by the incremental-type encoder and by carrying out a logical AND operation taking a Z phase signal providing absolute position information as input.

6. An electronic equipment comprising: a movable body; and position detection means comprised of an incremental-type encoder, an incremental-type counter, and a start point signal producing circuit for detecting a position of the movable body by setting a starting point of position detection by the incremental type encoder to a position the movable body passes through most frequently during movement of the movable body, the start point signal producing circuit being configured to output a starting point signal for resetting the incremental type counter and corresponding to the start point of position detection, the starting point signal being obtained by a logical operation of a signal outputted by the incremental-type encoder.

7. An electronic equipment according to claim 2; wherein the movable body is mounted to undergo pivotal movement; and wherein the position the moving body passes through the most frequently corresponds to a position disposed approximately at a center of a range of pivotal movement of the movable body.

8. An electronic equipment according to claim 2; wherein the movable body is mounted to undergo reciprocal movement; and wherein the position the movable body passes through the most frequently corresponds to a position disposed approximately at a center of a range of reciprocal movement of the movable body.

9. An electronic equipment according to claim 2; wherein a starting point signal for position detection is obtained using a pulse signal outputted by the incremental-type encoder.

10. An electronic equipment comprising: a movable body; and position detection means comprised of an incremental-type encoder, an incremental-type counter, and a start point signal producing circuit for detecting a position of the movable body by setting a starting point of position detection by the incremental type encoder to a position the movable body passes through most frequently during movement of the movable body, the start point signal producing circuit being configured to output a starting point signal for resetting the incremental type counter and corresponding to the start point of position detection; wherein a starting point signal for position detection is obtained using an A phase signal and a B phase signal differing in phase by ninety degrees outputted by the incremental-type encoder and by carrying out a logical AND operation taking a Z phase signal providing absolute position information as input.

11. An electronic equipment comprising: a movable body; driving means for driving the covable body; position detecting means for detecting a moving position of the movable body and outputting a current position signal corresponding to a current detected position; and control means for controlling the driving means to position the movable body at a target position in accordance with the current position signal from the position detecting means and with a target position signal corresponding to a target position wherein the position detecting means comprises an incremental-type encoder, an incremental-type counter, and a start point signal producing circuit for detecting the moving position of the movable body by setting a start point for position detection by the incremental-type encoder to a position the movable body passes through most frequently during movement of the movable body, the start point signal producing circuit being configured to output a starting point signal for resetting the incremental-type counter and corresponding to the start point of position detection, the starting point signal being obtained by a logical operation of a signal outputted by the incremental-type encoder.

12. An electronic equipment comprising: a movable body; driving means for driving the movable body; position detecting means for detecting a moving position of the movable body and outputting a current position signal corresponding to a current detected position; and control means for controlling the driving means to position the movable body at a target position in accordance with the current position signal from the position detecting means and with a target position signal corresponding to a target position; wherein the position detecting means comprises an incremental-type encoder, an incremental-type counter, and a start point signal producing circuit for detecting the moving position of the movable body by setting a start point for position detection by the incremental-type encoder to a position the movable body passes through most frequently during movement of the movable body, the start point signal producing circuit being configured to output a starting point signal for resetting the incremental-type counter and corresponding to the start point of position detection; wherein the driving means comprises an ultrasonic motor for driving the movable body to the start point when a new target position is specified, whereupon the incremental-type counter is reset and the ultrasonic motor moves the movable body to the newly specified target position; and wherein the control means includes means for turning the ultrasonic motor ON when the current detected position differs from the target position and for turning the ultrasonic motor OFF when the current detected position equals the target position.

13. An electronic equipment comprising: a movable body; driving means comprised of ultrasonic motor for driving the movable body; position detecting means for detecting a moving position of the movable body and outputting a current position signal corresponding to a current detected position; and control means for controlling the driving means to position the movable body at a target position in accordance with the current position signal from the position detecting means and with a target position signal corresponding to a target position; wherein the position detecting means comprises an incremental-type encoder, an incremental-type counter, and a start point signal producing circuit for detecting the moving position of the movable body by setting a start point for position detection by the incremental-type encoder to a position the movable body passes through most frequently during movement of the movable body, the start point signal producing circuit being configured to output a starting point signal for resetting the incremental-type counter and corresponding to the start point of position detection.

14. An electronic equipment comprising: a movable body mounted to undergo movement through a range of positions; and a position detector for detecting a position of the movable body by setting a starting point of position detection to a position within the range that the movable body passes through most frequently during movement of the movable body, and for carrying out a logical operation of a signal outputted by the position detector to obtain a starting point signal for position detection.

15. An electronic equipment according to claim 14; wherein the movable body is mounted to undergo pivotal movement; and wherein the position the movable body passes through most frequently is a position disposed approximately at a center of a range of pivotal movement of the movable body.

16. An electronic equipment according to claim 14; wherein the movable body is mounted to undergo reciprocal movement; and wherein the position the moving body passes through most frequently is a position disposed approximately at a center of a range of reciprocal movement of the movable body.

17. An electronic equipment according to claim 14; wherein the position detector comprises an incremental-type encoder for outputting a pulse signal; and wherein a starting point signal corresponding to the starting point of position detection is obtained from the pulse signal.

18. An electronic equipment according to claim 14; further comprising driving means for moving the movable body.

19. An electronic equipment according to claim 18; wherein the driving means comprises an ultrasonic motor.

20. An electronic equipment comprising: a movable body mounted to undergo movement through a range of positions; a position detector comprised of an incremental-type encoder for detecting a position of the movable body by setting a starting point of position detection to a position within the range that the movable body passes through most frequently during movement of the movable body; and means for obtaining a starting point signal corresponding to the starting point of position detection from an A phase signal and a B phase signal differing in phase by ninety degrees outputted by the incremental-type encoder and by carrying out a logical AND operation taking a Z phase signal providing absolute position information as input.

* * * * *